US010371300B2

(12) United States Patent
Fukumoto et al.

(10) Patent No.: US 10,371,300 B2
(45) Date of Patent: Aug. 6, 2019

(54) ROTARY JOINT

(71) Applicant: Nippon Pillar Packing Co., Ltd., Osaka (JP)

(72) Inventors: Takato Fukumoto, Osaka (JP); Yoshinori Kikuyama, Osaka (JP)

(73) Assignee: NIPPON PILLAR PACKING CO., LTD., Osaka-Shi, Osaka (JP)

( * ) Notice: Subject to any disclaimer, the term of this patent is extended or adjusted under 35 U.S.C. 154(b) by 564 days.

(21) Appl. No.: 15/031,261

(22) PCT Filed: Oct. 15, 2014

(86) PCT No.: PCT/JP2014/077471
§ 371 (c)(1),
(2) Date: Apr. 21, 2016

(87) PCT Pub. No.: WO2015/064365
PCT Pub. Date: May 7, 2015

(65) Prior Publication Data
US 2016/0258564 A1    Sep. 8, 2016

(30) Foreign Application Priority Data

Oct. 28, 2013 (JP) ................................. 2013-223409

(51) Int. Cl.
*F16L 39/06*    (2006.01)
*F16J 15/34*    (2006.01)

(52) U.S. Cl.
CPC ............... *F16L 39/06* (2013.01); *F16J 15/34* (2013.01)

(58) Field of Classification Search
CPC .................................................. F16L 39/06
(Continued)

(56) References Cited

U.S. PATENT DOCUMENTS 3,147,013 A    9/1964 Tracy
2008/0061514 A1    3/2008 Suzuki

FOREIGN PATENT DOCUMENTS

EP          2799752 A1    11/2014
JP      2003-042374     2/2003
(Continued)

OTHER PUBLICATIONS

International Search Report for Application No. PCT/JP2014/077471 (WO2015064365) dated Jan. 20, 2015 (4 pages).
(Continued)

*Primary Examiner* — Anna M Momper
*Assistant Examiner* — Fannie C Kee
(74) *Attorney, Agent, or Firm* — Lewis Roca Rothgerber Christie LLP

(57) ABSTRACT

A mechanical seal which defines an annular space formed between a case body and a shaft body is included. The mechanical seal includes: a first sealing ring having a first seal surface; a second sealing ring having a second seal surface which slidably contacts with the first seal surface; and a plurality of coil springs provided along the first sealing ring in a circumferential direction and configured to apply axial forces to the first sealing ring to press the first seal surface against the second seal surface. The plurality of coil springs are divided into a plurality of groups, and first regions in each of which occurring distortion is increased by the axial forces of the coil springs that belong to the group and second regions in each of which distortion is smaller than that in each first region are present alternately along the circumferential direction in the first sealing ring.

6 Claims, 13 Drawing Sheets

(58) Field of Classification Search
USPC .............. 285/121.1, 272, 98, 190, 273, 276,
285/280–281, 347, 351, 275
See application file for complete search history.

(56) References Cited

FOREIGN PATENT DOCUMENTS

| | | |
|---|---|---|
| JP | 2007-321827 | 12/2007 |
| JP | 2009-030665 | 2/2009 |
| JP | 2012-097761 | 5/2012 |
| JP | 2014-219020 | 11/2014 |

OTHER PUBLICATIONS

Extended European Search Report issued in parallel EP Application No. 14 85 7999 dated May 12, 2017, 5 pages.

ROTARY JOINT

CROSS-REFERENCE TO RELATED APPLICATIONS

The present application is a national phase application of International Application PCT/JP2014/077471, with an international filing date of Oct. 15, 2014, which claims the priority benefit of Japanese Application No. 10-2013-223409, filed Oct. 28, 2013, the contents of which are incorporated herein by reference in their entirety for all purposes.

TECHNICAL FIELD

The present invention relates to a rotary joint and particularly relates to a rotary joint including a mechanical seal.

BACKGROUND ART

A rotary joint is used for connecting a flow passage in a fixed-side member to a flow passage in a rotary-side member. For example, a chemical mechanical polishing apparatus (CMP apparatus) is used for performing surface polishing treatment of a semiconductor wafer. In the CMP apparatus, fluids such as a polishing solution, air for pressurization, washing water, pure water, air for air blow, a polishing residue liquid, and the like flow between a rotary-side member (a turntable or a top ring) and a fixed-side member (a CMP apparatus main body) which supports the rotary-side member. In order to allow such fluids to flow between the rotary-side member and the fixed-side member without mixing of these fluids, a joint portion that connects these members requires a plurality of independent fluid passages. Thus, for example, a multi-port rotary joint disclosed in Patent Literature 1 is used as such a joint portion.

FIG. 13 is a cross-sectional view of a conventional rotary joint. The rotary joint includes: a tubular case body 80; a shaft body 83 provided rotatably within the case body 80; and a plurality of mechanical seals 86 provided in a space 84 between the case body 80 and the shaft body 83. Each mechanical seal 86 includes first sealing rings 91 which are attached to the case body 80; second sealing rings 92 which rotate with the shaft body 83; and a plurality of coil springs 97. A plurality of independent fluid passages 85 are provided in the rotary joint.

The shaft body 83 includes a shaft main body 87 and sleeves 89 fitted externally on the shaft main body 87. The sleeves 89 are arranged along an axial direction alternately with the second sealing rings 92 of the mechanical seals 86. A pressing member 90 is fastened to the shaft main body 87 by a bolt 90a, whereby the sleeves 89 and the second sealing rings 92 are pressed in the axial direction. By the pressing force of the pressing member 90, the second sealing rings 92 and the sleeves 89 are pressed against each other, so that all the sleeves 89 and second sealing rings 92 are rotatable with the shaft main body 87 due to frictional forces therebetween.

In the case body 80, first flow passages 81 are formed so as to be opened at the outer peripheral side and the inner peripheral side thereof. In the shaft body 83 which includes the shaft main body 87 and the sleeves 89, second flow passages 82 are formed so as to be opened at the outer peripheral side thereof. In the shaft main body 87, flow passage holes 87a are formed as portions of the second flow passages 82, and in an axially central portion of each sleeve 89, a through hole 88 is formed as the other portion of the second flow passage 82. Each through hole 88 is connected to the flow passage hole 87a and serves as an opening hole of the second flow passage 82 at the outer peripheral side.

O-rings 93 are provided between the shaft main body 87, the sleeves 89, and the second sealing rings 92, thereby preventing a fluid flowing through each second flow passage 82 from entering another flow passage or leaking to the outside.

One first flow passage 81 and one second flow passage 82 are opened at the same height position in the axial direction and form one independent fluid passage 85. Thus, the mechanical seals 86 are provided in the space 84. That is, the first sealing rings 91, 91 of the mechanical seal 86 are provided at the radially outer side of each sleeve 89 and between the second sealing rings 92, 92 adjacent to each other across the sleeve 89, and an annular flow passage 96 is formed between these first sealing rings 91, 91 so as to connect the second flow passage 82 (the through hole 88) to the first flow passage 81.

The coil springs 97 of each mechanical seal 86 press the first sealing rings 91 against the second sealing rings 92 in the axial direction, so that the first sealing rings 91 contact with the second sealing rings 92 located adjacently thereto in the axial direction, thereby preventing a fluid from leaking through between the contacting surfaces thereof. That is, a portion of a side surface, in the axial direction, of each first sealing ring 91 is a first seal surface 91a, and a portion of an annular side surface of each second sealing ring 92 is a second seal surface 92a which slidably contacts with the first seal surface 91a. A fluid to be sealed partially enters between the first seal surface 91a and the second seal surface 92a to form a lubricating film between the seal surfaces 91a, 92a, thereby obtaining a lubricating effect.

Due to the above configuration, the shaft main body 87, the sleeves 89, and the second sealing rings 92 are rotatable together relative to the case body 80, and the rotating second sealing rings 92 slidably contact with the first sealing rings 91 which are at a stationary side, so that the function as the mechanical seals 86 is exerted, whereby the independent fluid passages 85 are formed.

CITATION LIST

Patent Literature

PATENT LITERATURE 1: Japanese Laid-Open Patent Publication No. 2007-321827

SUMMARY OF INVENTION

Technical Problem

When the rotary joint having the above-described configuration is used over a long period of time, the seal surfaces 91a of the first sealing rings 91 and the seal surfaces 92a of the second sealing rings 92 are polished due to sliding contact between the seal surfaces 91a, 92a, and the surface accuracy (e.g., flatness) of the seal surfaces 91a, 92a increases in time.

In this case, the seal surfaces 91a, 92a may adhere by suction to each other, so that a fluid that can contribute to lubrication cannot enter between the seal surfaces 91a, 92a and a lubricating film is unlikely to be formed therebetween. Thus, sliding friction (sliding torque) between the first sealing rings 91 and the second sealing rings 92 may increase more than expected. In particular, in the case where the materials of the sealing rings 91, 92 are relatively hard materials (silicon carbide, a superhard alloy, etc.), the above adhesion by suction is likely to occur, so that the sliding friction is likely to increase more than expected.

Rotation of each first sealing ring 91 is prevented at the case body 80, for example, by engaging a drive pin 95 fixed to the case body 80 with a claw portion (recess portion) 94 or the like provided at a portion of the first sealing ring 91. However, when the sliding friction between the first sealing ring 91 and the second sealing ring 92 increases as described above such that the first sealing ring 91 attempts to rotate with the second sealing ring 92, the claw portion 94 or the like for rotation prevention may be broken.

In addition, in contrast, when rotation of the second sealing ring 92 is suppressed by the first sealing ring 91, the second sealing ring 92 and the sleeve 89 may slide relative to each other to wear or break an end face 89a of the sleeve 89. In addition, the second sealing ring 92 and the O-ring 93 may slide relative to each other to damage the O-ring 93. Such an increase in the sliding friction is likely to occur when a peripheral speed (rotation speed) is relatively low.

Therefore, an object of the present invention is to provide a rotary joint that allows for suppression of an increase in sliding friction between a first sealing ring and a second sealing ring in a mechanical seal.

Solution to Problem (1) The present invention is a rotary joint including: a tubular case body having a first flow passage formed therein so as to be opened at an inner peripheral side thereof; a shaft body provided within the case body so as to be rotatable relative to the case body and having a second flow passage formed therein so as to be opened at an outer peripheral side thereof; and a mechanical seal provided in an annular space formed between the case body and the shaft body, the mechanical seal defining the annular space to form a flow passage connecting the first flow passage to the second flow passage. The mechanical seal includes: a first sealing ring attached to the case body and having an annular first seal surface at one side in an axial direction; a second sealing ring attached to the shaft body and having an annular second seal surface which slidably contacts with the first seal surface; and a plurality of elastic members provided along the first sealing ring in a circumferential direction and configured to apply axial forces to the first sealing ring to press the first seal surface against the second seal surface. The plurality of elastic members are divided into a plurality of groups each composed of a predetermined number of the elastic members aligned continuously in the circumferential direction, and first regions in each of which occurring distortion is increased by the axial forces of the elastic members that belong to the group and second regions in each of which distortion is smaller than that in each first region are present alternately along the circumferential direction in the first sealing ring.

According to the present invention, in the first sealing ring of the mechanical seal that is being used, the first regions in each of which occurring distortion is increased by the axial forces of the predetermined number of the elastic members aligned continuously in the circumferential direction and the second regions in each of which distortion is smaller than that in each first region are present alternately along the circumferential direction in the first sealing ring. Thus, small concaves and convexes are formed on the first seal surface of the first sealing ring (the first seal surface waves modestly), so that a slight gap occurs partially between the first seal surface of the first sealing ring and the second seal surface of the second sealing ring. By a fluid entering this gap, a lubricating film is easily formed, and the lubricating performance improves. Therefore, it is possible to suppress an increase in sliding friction between the first sealing ring and the second sealing ring to prevent occurrence of a problem such as breakage of another member due to application of an unexpected load to the other member.

(2) In the mechanical seal of the rotary joint of the above (1), an absence section in which the elastic members are not present may be interposed between the groups adjacent to each other in the circumferential direction, whereby the first regions and the second regions are present alternately along the circumferential direction in the first sealing ring.

In this case, distortion can be increased in each first region of the first sealing ring by the axial forces of the elastic members that belong to each group, and distortion can be decreased in each second region of the first sealing ring (almost no distortion can be caused to occur) due to the absence section in which the elastic members are not present.

(3) In the case of the above (2), a circumferential pitch of the elastic members that belong to each of the groups is preferably set so as to be smaller than a circumferential pitch of the elastic members in a case where the plurality of elastic members are assumed to be arranged at equal intervals along the circumferential direction.

In this case, the elastic members can be arranged in each group in a concentrated manner, and a section of each group in which the elastic members are present and the absence section in which the elastic members are not present can be clearly demarcated. That is, it is possible to further effectively obtain a configuration in which the first regions and the second regions are clearly defined and the lubricating film is easily formed.

(4) In the mechanical seal of the rotary joint of the above (1), the plurality of elastic members may be arranged at equal intervals along the circumferential direction, and the groups in each of which a total axial force by the predetermined number of the elastic members is great and the groups in each of which a total axial force by the predetermined number of the elastic members is small may be arranged alternately along the circumferential direction, whereby the first regions and the second regions are present alternately along the circumferential direction in the first sealing ring.

In this case, distortion can be increased in each first region of the first sealing ring by the elastic members that belong to each group in which the total axial force is great, and distortion can be decreased in each second region of the first sealing ring by the elastic members that belong to each group in which the total axial force is small.

(5) According to the mechanical seal of each rotary joint described above, a force of pressing the first sealing ring (the first seal surface) against the second sealing ring (the second seal surface) which force is generated by the plurality of elastic members becomes nonuniform in the circumferential direction. However, since the first regions and the second regions are present alternately along the circumferential direction in the first sealing ring, and the number of the elastic members included in each group is the same, the mechanical seal in which the force is balanced as a whole is obtained.

(6) The plurality of elastic members are preferably divided into two to four groups. If the number of the groups exceeds four, the first regions in each of which distortion is increased affect the second regions in each of which distortion should be decreased, so that distortion in each second region tends to increase. Thus, small concaves and convexes are unlikely to be formed on the first seal surface of the first sealing ring (the first seal surface is unlikely to have a wavy shape), and an effective gap (partial gap) is difficult to occur between the first seal surface of the first sealing ring and the second seal surface of the second sealing ring.

Advantageous Effects of Invention

According to the present invention, in the mechanical seal, by causing distortion in the first sealing ring, a slight gap occurs partially between the first seal surface of the first sealing ring and the second seal surface of the second sealing ring. By a fluid entering this gap, a lubricating film is easily formed, and the lubricating performance improves. Therefore, an increase in sliding friction between the first sealing ring and the second sealing ring can be suppressed, and, for example, it is possible to prevent occurrence of a problem such as breakage of another member due to application of an unexpected load to the other member.

DESCRIPTION OF EMBODIMENTS

Hereinafter, embodiments of the present invention will be described.

[Entire Configuration]

Figure 1:
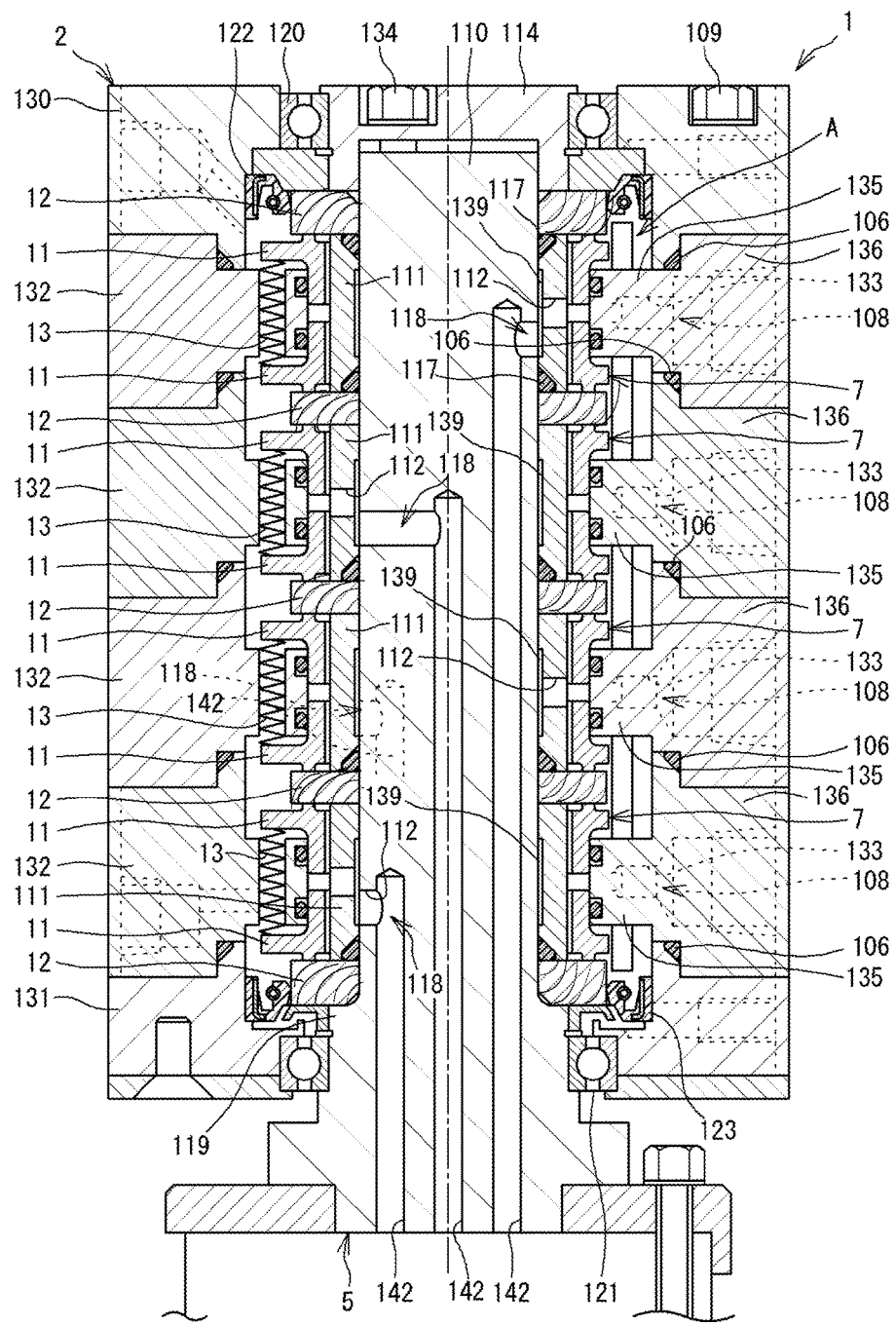
FIG. 1 is a longitudinal cross-sectional view showing a rotary joint according to the present invention.

FIG. 1 is a longitudinal cross-sectional view of a rotary joint 1 according to the present invention. The rotary joint 1 (hereinafter, also referred to as joint 1) includes: a tubular case body 2 attached to a fixed-side member (e.g. a CMP apparatus main body) of a rotary apparatus; and a shaft body 5 attached to a rotary-side member of the rotary apparatus (e.g. a top ring or a turntable of a CMP apparatus). In the present embodiment, the upper side in FIG. 1 is defined as an "upper side" of the joint 1 and the lower side in FIG. 1 is defined as a "lower side" of the joint 1. The attitude of the joint 1 may be an attitude other than the attitude shown in FIG. 1. In addition, in the present invention, an axial direction is a direction along a center line of the rotary joint 1 (including a direction parallel to the center line), and the case body 2, the shaft body 5, and mechanical seals 7 described later are configured such that a center line of each of the case body 2, the shaft body 5, and the mechanical seals 7 coincides with the center line of the rotary joint 1.

In the joint 1, N (N is an integer not less than 2 and is 4 in the illustrated example) fluid passages 108 are formed. Each fluid passage 108 is formed by connecting one first flow passage 133 provided in the case body 2 to one second flow passage 118 provided in the shaft body 5. One fluid passage 108 is provided independently of the other fluid passages 108, and N mechanical seals 7 are provided along the shaft body 5 so as to prevent a fluid flowing through each fluid passage 108 from being mixed with a fluid flowing through another fluid passage 108.

[Case Body 2]

The case body 2 includes upper and lower end flanges 130, 131 and N flow passage flanges 132 provided between these end flanges 130, 131. These flanges 130, 131, and 132 each have an annular shape and are fixedly connected to each other by a bolt 109, so that the case body 2 is a tubular structure as a whole. In addition, O-rings 106 are provided between the adjacent flow passage flanges 132, 132 and between the adjacent end flange 130 (131) and flow passage flange 132, respectively.

Each flow passage flange 132 includes an annular main body portion 136 having a large dimension in an axial direction; and a projection portion 135 which has a smaller dimension in the axial direction than the main body portion 136 and projects inward in a radial direction from the main body portion 136. In each flow passage flange 132, a first flow passage 133 is formed so as to extend therethrough in the radial direction. The first flow passage 133 is opened at the inner peripheral side and the outer peripheral side. In the present embodiment, the openings of the first flow passages 133 at the outer peripheral side are connection ports to which a plurality of pipes of the fixed-side member are connected, respectively. Due to the above, the case body 2 has a configuration in which a plurality of the first flow passages 133 are formed therein.

[Shaft Body 5]

The shaft body 5 includes a linear shaft main body 110 that is long in an up-down direction; and tubular sleeves 111 that are fitted externally on the shaft main body 110. In addition to the sleeves 111, annular second sealing rings 12 of the mechanical seals 7 are fitted externally on the shaft main body 110, and the sleeves 111 and the second sealing rings 12 are arranged alternately along the axial direction. The number of the provided sleeves 111 is N, and the number of the provided second sealing rings 12 is N+1. A pressing member 114 is fixed to an upper portion of the shaft main body 110 by a bolt 134.

The shaft main body 110 has a large-diameter portion 119 having an increased diameter and provided at the lower side thereof (one side in the axial direction). The large-diameter portion 119 restricts downward movement of the sleeves 111 and the second sealing rings 12 which are fitted externally on the shaft main body 110.

In addition, N flow passage holes 142 are formed within the shaft main body 110, and these flow passage holes 142 are opened on an outer peripheral surface of the shaft main body 110 and at height positions different from each other in the axial direction (up-down direction). The flow passage holes 142 are also opened at the other side thereof on an end face (lower end face) of the shaft main body 110, and a plurality of pipes of the rotary-side member are connected to the openings thereof on the end face, respectively.

Figure 2A:
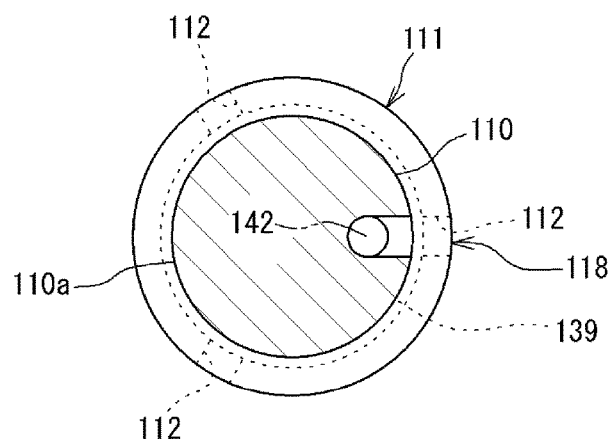
FIGS. 2A-2B illustrate a sleeve fitted externally on a shaft main body, (2A) is a view as seen from an axial direction (the front), and (2B) is a cross-sectional view as seen from the side.
Figure 2B:
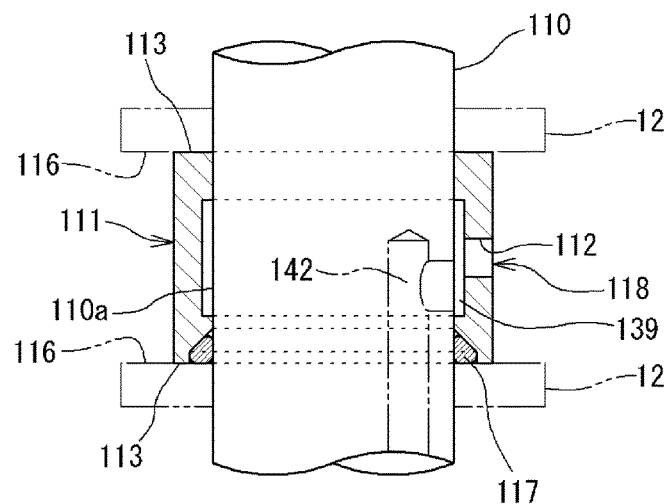

FIG. 2 illustrates the sleeve 111 fitted externally on the shaft main body 110, (A) is a view as seen from the axial direction (the front), and (B) is a cross-sectional view as seen from the side. In FIG. 2(B), the second sealing rings 12 are shown by alternate long and two short dashes lines. A plurality of (three in the illustrated example) through holes 112 are formed in the sleeve 111 so as to be spaced apart from each other at equal intervals in a circumferential direction, and these through holes 112 are formed at the same position in the axial direction. In addition, at the radially inner side of the sleeve 111, an annular gap 139 is formed between the sleeve 111 and the outer peripheral surface 110a of the shaft main body 110, and each through hole 112 is connected to the annular gap 139. In addition, the annular gap 139 is connected to the flow passage hole 142 of the shaft main body 110.

One flow passage hole 142 within the shaft main body 110, the annular gap 139 within one sleeve 111, and the plurality of through holes 112 in the sleeve 111 form one second flow passage 118. Furthermore, as shown in FIG. 2(B), an O-ring 117 is provided between the shaft main body 110, the sleeve 111, and the second sealing ring 12, thereby preventing the fluid flowing through each second flow passage 118 from entering another flow passage or leaking to the outside. As shown in FIG. 1, two O-rings 117 are provided at an upper portion and a lower portion of the uppermost sleeve 111, respectively.

Due to the above, the shaft body 5 has a configuration in which N second flow passages 118 which are opened at the outer peripheral side thereof are formed therein, and each through hole 112 formed in each sleeve 111 is an opening hole of the second flow passage 118 at the outer peripheral side. In addition, these second flow passages 118 are opened toward the inner peripheral side of the case body 2 and at positions different from each other in the axial direction (up-down direction).

An assembly structure of the shaft body 5, which includes the shaft main body 110 and the sleeves 111, and the second sealing rings 12 of the mechanical seal 7 will be described. In FIG. 2, the second sealing rings 12 have annular side surfaces (annular side surfaces 116, 116) at both sides thereof in the axial direction. An end face 113 of the sleeve 111 contacts with each annular side surface 116, and the sleeve 111 serves as a spacer between the second sealing rings 12, 12.

In FIG. 1, the pressing member 114 is a bottomed cylindrical member that is fastened to the shaft main body 110 in the axial direction by the bolt 134. By the pressing member 114 being fastened, all the sleeves 111 and second sealing rings 12 are pressed toward the large-diameter portion 119 of the shaft main body 110 in the axial direction. The pressing force (the fastening force in the axial direction) by the pressing member 114 is uniform in the circumferential direction. By the pressing force, the sleeves 111 are pressed against the second sealing rings 12, so that all the sleeves 111 and second sealing rings 12 are integrated with the shaft main body 110, whereby all the sleeves 111 and second sealing rings 12 are rotatable with the shaft main body 110 due to frictional forces therebetween.

A rolling bearing 120 is provided between the pressing member 114 and the end flange 130, and a rolling bearing 121 is provided between the large-diameter portion 119 of the shaft main body 110 and the end flange 131. Thus, the shaft body 5, which includes the sleeves 111 and the shaft main body 110, is rotatable with the second sealing rings 12 relative to the case body 2.

A seal member (oil seal) 122 is provided between the upper end flange 130 and the uppermost second sealing ring 12, and a seal member (oil seal) 123 is provided between the lower end flange 131 and the lowermost second sealing ring 12. An annular space A is formed between the case body 2 and the shaft body 5. In the annular space A, a sealed space is formed between the seal members 122, 123.

[Mechanical Seals 7]

As described above, the annular space A is formed between the case body 2 and the shaft body 5, and the mechanical seals 7 are provided in the annular space A. The N mechanical seals 7 are provided so as to be aligned along the shaft body 5. Thus, the joint 1 according to the present embodiment is a multi-flow passage rotary joint in which a plurality of mechanical seals 7 are arranged in a serial direction.

Figure 3:
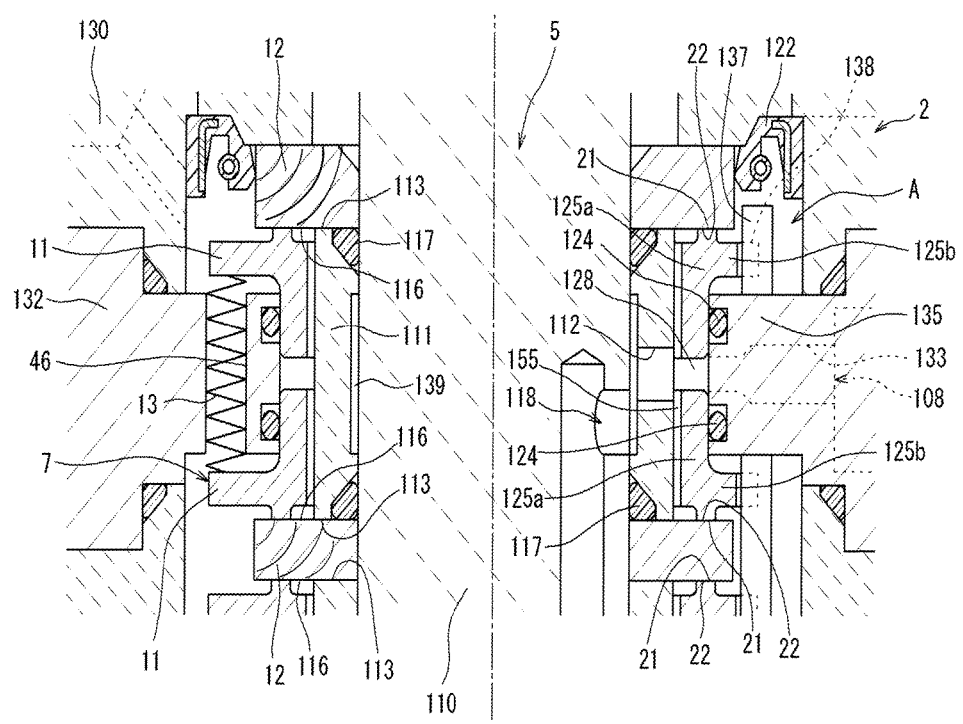
FIG. 3 is a cross-sectional view showing an uppermost mechanical seal and a peripheral area thereof.

Each mechanical seal 7 is provided for forming one fluid passage 108 by one first flow passage 133 and one second flow passage 118. The function of each of the plurality of mechanical seals 7 is the same. Here, the uppermost mechanical seal 7 will be described as a representative. FIG. 3 is a cross-sectional view showing the uppermost mechanical seal 7 and a peripheral area thereof.

One sleeve 111 and one flow passage flange 132 are opposed to each other in the radial direction, and the second flow passage 118 opened at the sleeve 111 and the first flow passage 133 opened at the inner peripheral side of the flow passage flange 132 are opened at substantially the same position in the axial direction. One mechanical seal 7 is provided between the second flow passage 118 and the first flow passage 133.

Each mechanical seal 7 includes first sealing rings 11, the second sealing rings 12, and coil springs 13 as elastic members. Since the second sealing rings 12 rotate with the shaft main body 110 as described above, the second sealing rings 12 are rotary rings (rotary-side sealing rings) of the mechanical seal 7. Meanwhile, the first sealing rings 11 are stationary with the case body 2 and thus are stationary rings (stationary-side sealing rings) of the mechanical seal 7.

Each second sealing ring 12 is composed of an annular member, and the upper and lower annular side surfaces 116 thereof each are an annular surface along a plane (a horizontal plane) that is orthogonal to the center line of the rotary joint 1 in a state before a pressing force is applied thereto by the pressing member 114 (see FIG. 1).

The upper and lower first sealing rings 11 are paired as a set, and the set of the first sealing rings 11, 11 are components of one mechanical seal 7. Rotation of each first sealing ring 11 is prevented at the case body 2. In the present embodiment, a pin 137 is fixed to the flow passage flanges 132 so as to extend in the axial direction, and a claw portion (recess portion) 138 is formed at a portion of each first sealing ring 11 so as to sandwich the pin 137 from both sides thereof in the circumferential direction. The claw portion 138 contacts with the pin 137 from both sides thereof in the circumferential direction, whereby rotation of each first sealing ring 11 is prevented.

The set of the first sealing rings 11, 11 are provided at the radially outer side of the sleeve 111 and between the second sealing rings 12, 12 adjacent vertically to each other across the sleeve 111. As described above, each axial end face 113 of the sleeve 111 contacts with a portion (a portion at the inner-diameter side) of the annular side surface 116 of the second sealing ring 12. The first sealing ring 11 contacts with the other portion (the other portion at the outer-diameter side) of the annular side surface 116. That is, the set of the first sealing rings 11, 11 have annular first seal surfaces 21, 21, and these first seal surfaces 21, 21 contact with the other portions (the other portions at the outer-diameter side) of the annular side surfaces 116, 116 of the second sealing rings 12, 12 present at both sides thereof in the axial direction. Each second sealing ring 12 has, in the other portion (the other portion at the outer-diameter side) of the annular side surface 116, a second seal surface 22 which contacts with the first seal surface 21.

Each first sealing ring 11 is composed of an annular member having an L shape in its cross section, and includes a tubular first portion 125a and an annular second portion 125b extending outward in the radial direction from an end portion of the first portion 125a. The annular first seal surface 21 is formed in a portion at the axially outer side of the second portion 125b. In addition, the claw portion (recess portion) 138 for preventing rotation of the first sealing ring 11 is formed at the second portion 125b.

The coil springs 13 are interposed between the first sealing rings 11, 11 paired as a set, so as to be compressed. Thus, by elastic restoring forces of the coil springs 13, each first sealing ring 11 is pressed in the axial direction toward the second sealing ring 12 side, so that a pressing force in the axial direction acts between the first seal surface 21 and the second seal surface 22. The coil springs 13 can narrow the gap between the first seal surface 21 and the second seal surface 22. A plurality of the coil springs 13 are provided along the circumferential direction, and, for example, the number of the coil springs 13 can be 12. The number of the coil springs 13 is changeable depending on the diameter dimension of the mechanical seal 7 or the like.

Each coil spring 13 is inserted in a hole 46 formed in the flow passage flange 132 and is held by the hole 46. A plurality of the holes 46 are formed along the circumferential direction. The number of the holes 46 is equal to the number of the coil springs 13, and the holes 46 are formed according to the arrangement of the coil springs 13. The arrangement of the coil springs 13 will be described later. Each hole 46 may be a bottomed hole having a hole depth direction that is the axial direction. In this case, the holes 46 are formed at both sides of the flow passage flange 132 in the axial direction, and the coil springs 13 are mounted in the respective holes 46.

The coil springs 13 press the first sealing rings 11, 11 toward both sides in the axial direction (the upper side and the lower side), and each first seal surface 21 is pressed against the second seal surface 22 of the second sealing ring 12 by this pressing force. The first seal surface 21 and the second seal surface 22 contact with each other in a state of pressing each other in the axial direction, so that the first seal surface 21 slidably contacts with the second seal surface 22 of the rotating second sealing ring 12, thereby exerting a sealing function to prevent a fluid from leaking through between the seal surfaces 21, 22. That is, the sealing function of the mechanical seal 7 is exerted by sliding contact action occurring with relative rotation of the seal surfaces 21 of the stationary-side first sealing rings 11 and the second seal surfaces 22 of the rotary-side second sealing rings 12.

The set of the first sealing rings 11, 11 are provided so as to have gaps between the outer peripheral surface of the sleeve 111 and the first sealing rings 11, 11, so that cylindrical flow passages (cylindrical spaces) 155 are formed between these first sealing rings 11, 11 and the sleeve 111. The cylindrical flow passages 155 are connected to the through hole 112 formed in the sleeve 111. The sealing function by the seal surfaces 21, 22 and the sealing function by the O-rings 117 prevent a fluid in the flow passages 155 from leaking to the outside.

An annular flow passage 128 is formed between the set of the first sealing rings 11, 11 and is connected to the cylindrical flow passages 155. O-rings 124 are provided between the outer peripheral surfaces of the first portions 125a of the first sealing rings 11, 11 and the inner peripheral surface of the projection portion 135 of the flow passage flange 132, and the sealing function by the O-rings 124 prevents a fluid in the annular flow passage 128 from leaking to the outside. The first sealing rings 11, 11 are fitted and held in a state of being movable in the axial direction relative to the projection portion 135 of the flow passage flange 132 via the O-rings 124.

Accordingly, the sealed annular flow passage 128 and the sealed cylindrical flow passage 155 are provided between the first flow passage 133 and the second flow passage 118, and these flow passages 155, 128 are flow passages connecting the second flow passage 118 to the first flow passage 133. As described above, the first flow passage 133 and the second flow passage 118 are connected to each other by the flow passages 128, 155 formed by the mechanical seal 7, and the first flow passage 133, the annular flow passage 128, the cylindrical flow passages 155, and the second flow passage 118 form one independent fluid passage 108.

Due to the above, the mechanical seal 7 defines the annular space A formed between the case body 2 and the shaft body 5, to form a flow passage (128, 155) connecting the first flow passage 133 to the second flow passage 118. A plurality of the (12) coil springs 13 are provided along the second portions 125b of the first sealing rings 11 in the circumferential direction, and these coil springs 13 apply axial forces to each first sealing ring 11 to press the first seal surface 21 against the second seal surface 22.

Accordingly, when the shaft body 5 rotates, the second sealing rings 12 rotate with the shaft body 5 relative to the first sealing rings 11 which are stationary in relation to the rotation direction, so that each first seal surface 21 and each second seal surface 22 slidably contact with each other, thereby preventing the fluid from leaking through between these seal surfaces 21, 22. At this time, the fluid can enter between the first seal surface 21 and the second seal surface 22, so that a lubricating film is formed by the fluid. By the lubricating film, the sliding contact between the seal surfaces 21, 22 can be made favorable, so that the sliding friction between the seal surfaces 21, 22 can be reduced, and occurrence of a problem such as abnormal wear between the seal surfaces 21, 22 or surface roughening of the seal surfaces 21, 22 can be suppressed.

[Arrangement (Part 1) of Coil Springs 13]

Figure 4:
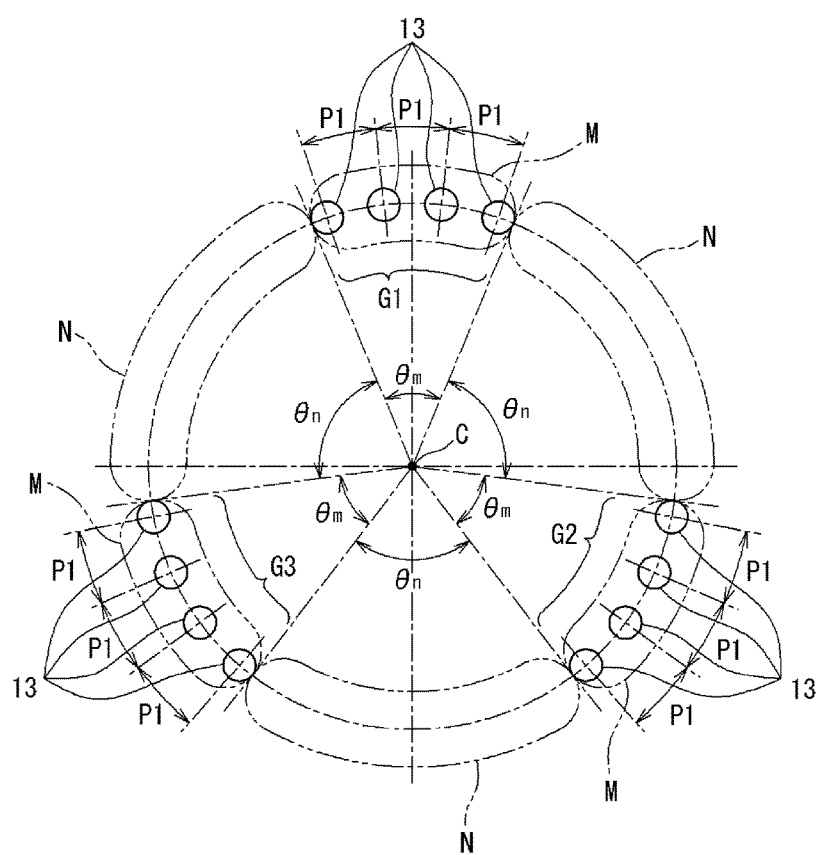
FIG. 4 illustrates an arrangement (part 1) of coil springs, and is a view of the mechanical seal as seen from the axial direction.

FIG. 4 illustrates the arrangement of the coil springs 13 in the mechanical seal 7, and is a view of the mechanical seal 7 as seen from the axial direction. In the embodiment shown in FIG. 4, 12 coil springs 13 are provided and arranged on the same circle. In addition, all these coil springs 13 have the same configuration, are formed from the same material, and have the same elastic characteristic (spring constant).

The 12 coil springs 13 are divided into a plurality of groups. In the present embodiment, the 12 coil springs 13 are divided into three groups G1, G2, and G3, and each group includes four coil springs 13. These groups G1, G2, and G3 are arranged at equal intervals in the circumferential direction with a point C on the center line of the mechanical seal 7 (the center lines of the sealing rings 11, 12) as a center. That is, the groups G1, G2, and G3 are arranged every 120 degrees. The sections present every 120 degrees are presence sections M in each of which the four coil springs 13 included in each of the groups G1, G2, and G3 are present, and an absence section N in which no coil spring 13 is present is interposed between the groups (presence sections M) adjacent to each other in the circumferential direction. That is, an absence section N is interposed between the group G1 and the group G2, an absence section N is interposed between the group G2 and the group G3, and an absence section N is interposed between the group G3 and the group G1.

In the case of FIG. 4, the range, in the circumferential direction, of each absence section N is a range between the coil spring 13 at an end that belongs to one group (G1) and the coil spring 13 that belongs to another group (G2) and is closest to this coil spring 13, and this range in the circumferential direction is broader than the range, in the circumferential direction, of the presence section M in which the four coil springs 13 included in each group are provided. That is, when the point C is set as a center, an angle θn corresponding to each absence section N is greater than an angle θm corresponding to the presence section M of each of the groups G1, G2, and G3 (θn>θm). The arrangements of the coil springs 13 in the respective groups G1, G2, and G3 are the same, and all the angles θm have the same value.

Figure 5:
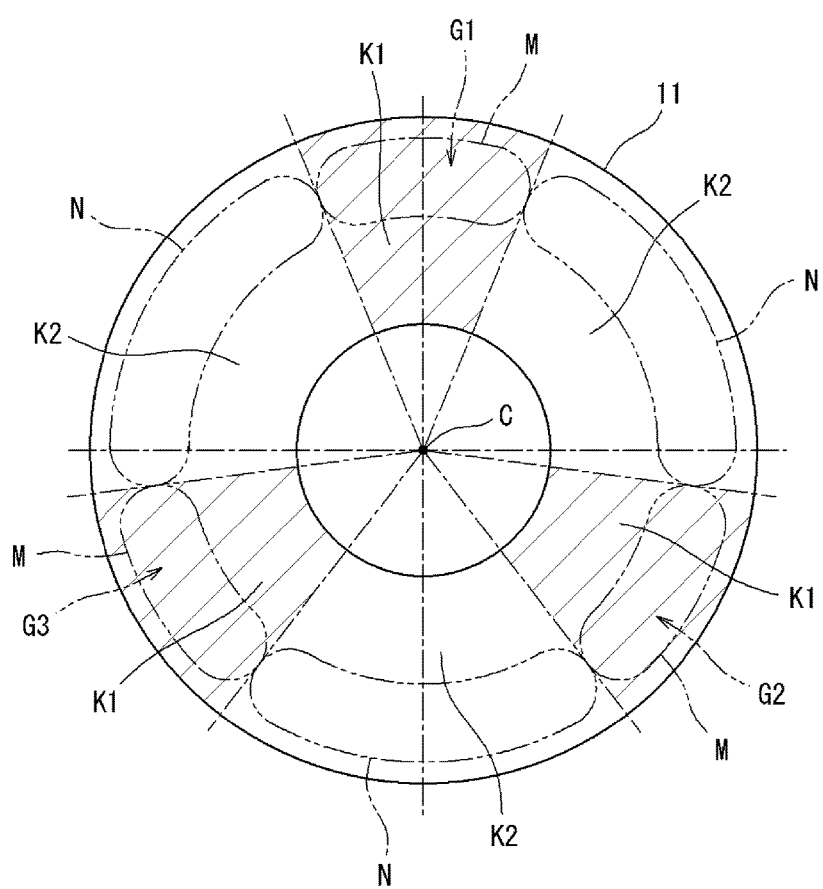
FIG. 5 is a schematic view of a first sealing ring as seen from the axial direction.

The four coil springs 13 included in each of the groups G1, G2, and G3 can contact with and directly press a first region K1 which is a portion of the first sealing ring 11 shown in FIG. 5, toward the axial direction. On the other hand, no coil spring 13 contacts with and directly presses a second region K2, which is another portion of the first sealing ring 11 corresponding to each absence section N, toward the axial direction. FIG. 5 is a schematic view of the first sealing ring 11 as seen from the axial direction. In FIG. 5, the first regions K1 are hatched regions, and regions other than the first regions K1 are the second regions K2.

Each first region K1 receives a total axial force obtained by combining the axial forces of the four coil springs 13, whereby relatively great distortion occurs in the first region K1. That is, the first seal surface 21 gradually shifts to a convex shape. On the other hand, each second region K2 does not directly receive the axial forces of the coil springs 13, so that (almost) no distortion occurs in the second region K2. That is, (almost) no change in the shape of the first seal surface 21 occurs. However, as the first seal surface 21 in each first region K1 shifts to the convex shape, the first seal surface 21 in each second region K2 relatively and gradually shifts to a concave shape.

Circumferential pitches of the coil springs 13 will be described.

Figure 12:
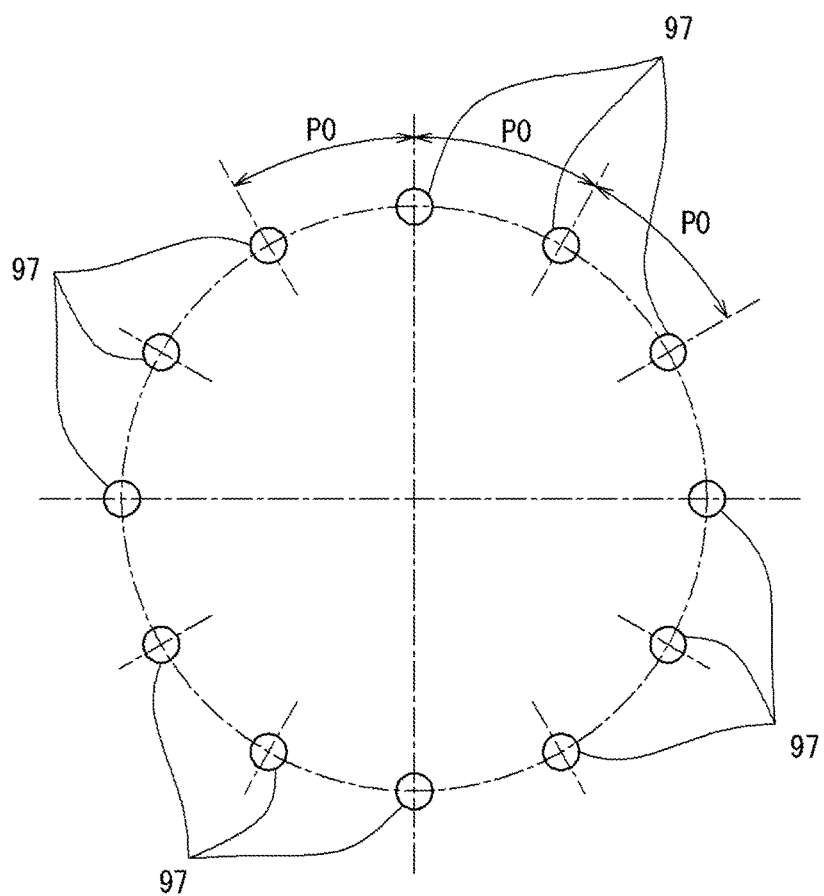
FIG. 12 illustrates an arrangement of coil springs of a conventional mechanical seal, and is a view of a mechanical seal as seen from an axial direction.
Figure 13:
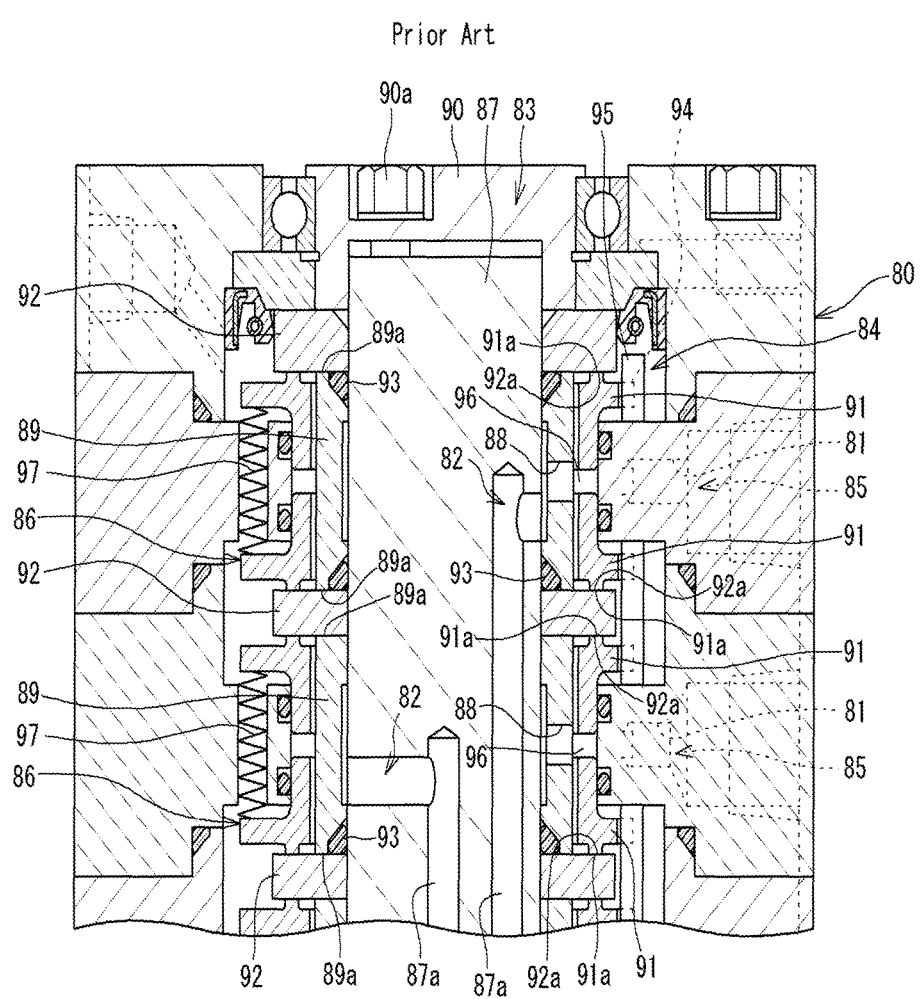
FIG. 13 is a longitudinal cross-sectional view showing a conventional rotary joint.

In a conventional mechanical seal, as shown in FIG. 12, coil springs 97 are arranged at equal intervals along the circumferential direction. Circumferential pitches of the coil springs 97 in the case of this conventional example are denoted by P0.

On the other hand, in the mechanical seal 7 of the present embodiment, as shown in FIG. 4, the four coil springs 13 that belong to each group are arranged at equal intervals along the circumferential direction, and circumferential pitches P1 of the four coil springs 13 that belong to each group are uniform, but the 12 coil springs 13 are provided at unequal intervals as a whole.

In the present embodiment, each of the circumferential pitches P1 (see FIG. 4) of the coil springs 13 that belong to each group is set so as to be smaller than each of the circumferential pitches P0 of the coil springs 97 in the case where all the coil springs 97 (see FIG. 12) are assumed to be arranged at equal intervals along the circumferential direction. That is, P1<P0.

As described above, in the present embodiment, the four coil springs 13 that are aligned continuously in the circumferential direction form one group, and the 12 coil springs 13 are divided into the three groups G1, G2, and G3 as a whole. As shown in FIG. 5, in the first sealing ring 11, the first regions K1 and the second regions K2 are present alternately along the circumferential direction. Among these regions, each first region K1 is a region in which distortion occurring in the first sealing ring is increased by the axial forces of the coil springs 13 that belong to each group (the total axial force). On the other hand, each second region K2 is a region in which distortion is smaller than that in each first region K1 (a region in which almost no distortion occurs).

In particular, in the present embodiment, the absence section N in which no coil spring 13 is present is interposed between the groups adjacent to each other in the circumferential direction, whereby the first regions K1 and the second regions K2 are present alternately along the circumferential direction. As described above, distortion can be increased in each first region K1 of the first sealing ring 11 by the axial forces of the coil springs 13 that belong to each group (the total axial force), and distortion can be decreased in each second region K2 of the first sealing ring 11 (almost no distortion can be caused to occur) due to the absence section N in which no coil spring 13 is present.

According to the mechanical seal 7, since the first regions K1 and the second regions K2 are present alternately along the circumferential direction in the first sealing ring 11, small concaves and convexes are formed on the first seal surface 21 of the first sealing ring 11 (the first seal surface 21 waves modestly) during use, so that a slight gap occurs partially between the first seal surface 21 of the first sealing ring 11 and the second seal surface 22 of the second sealing ring 12. This slight gap occurs in a portion corresponding to each second region K2.

A very small part of the fluid flowing through the fluid passage 108 (see FIG. 1) can enter this gap, so that a lubricating film is easily formed between the seal surfaces 21, 22 by this fluid, thereby improving the lubricating performance.

Here, rotation of the first sealing ring 11 is prevented at the case body 2 by engaging the drive pin 137 with the claw portion 138 (see FIG. 3) as described above. Here, if the sliding friction between the first sealing ring 11 and the second sealing ring 12 increases so that the first sealing ring 11 attempts to rotate with the second sealing ring 12, an unexpected load may be applied to the claw portion 138 for rotation prevention, to break the claw portion 138. However, in the present embodiment, by causing distortion to occur in the first sealing ring 11, the fluid can enter between the first sealing ring 11 and the second sealing ring 12 to form a lubricating film therebetween, thereby suppressing an increase in the sliding friction between the first sealing ring 11 and the second sealing ring 12. Thus, it is possible to prevent the above breakage.

If the sliding friction between the seal surfaces 21, 22 increases so that rotation of the second sealing ring 12 is suppressed by the first sealing ring 11, the second sealing ring 12 and the sleeve 111 (see FIG. 3) may slide relative to each other to wear the end face 113 of the sleeve 111, or the second sealing ring 12 and the O-ring 117 may slide relative to each other to damage the O-ring 117. However, in the present embodiment, since an increase in the sliding friction between the first sealing ring 11 and the second sealing ring 12 can be suppressed, it is possible to prevent such breakage or damage.

Furthermore, according to the mechanical seal 7 of the present embodiment, abnormal wear, surface roughening, and the like are unlikely to occur at the seal surfaces 21, 22, and it is possible to suppress occurrence of leak of the fluid through between the seal surfaces 21, 22.

In particular, when such a mechanical seal 7 is used under a high-load condition such as a high temperature, a high pressure, a high peripheral speed, and the like, the conventional art has a problem that a lubricating film that should be interposed between the seal surfaces is likely to vaporize to cause insufficient lubrication, so that damage or the like of each portion as described above occurs in the case of long-term use. In particular, in the case where performance of cooling the mechanical seal 7 is low, vaporization of the lubricating film is further likely to occur, and the above problem is likely to occur. However, according to the mechanical seal 7 according to the present embodiment, a lubricating film is easily formed between the seal surfaces 21, 22 by the fluid, so that occurrence of such a problem can be suppressed.

Furthermore, in the present embodiment, each of the circumferential pitches P1 (see FIG. 4) of the coil springs 13 that belong to each group is set so as to be smaller than each of the circumferential pitches P0 of the coil springs 97 (see FIG. 12) in the case where all the coil springs 97 are assumed to be arranged at equal intervals along the circumferential direction (P1<P0). Thus, in the present embodiment, the coil springs 13 can be arranged in each group in a concentrated manner, and the groups (presence sections M) in which the coil springs 13 are present and the absence sections N in which no coil spring 13 is present can be clearly demarcated. Thus, it is possible to further effectively obtain a configuration in which the first regions K1 and the second regions K2 are clearly defined and the lubricating film is easily formed.

In the embodiment shown in FIG. 4, the number of the coil springs 13 included in one group is four, but only needs to be a predetermined number equal to or greater than 2, and the predetermined number only needs to be 1/Y (Y is an integer equal to or greater than 2) of the total number of the coil springs 13. In the case of FIG. 4, the total number is 12, and Y=3. That is, Y is the number of the groups.

In addition, the number of the groups can be changeable, and the number of the coil springs 13 included in one group is also changed depending on the number of the groups. When the total number of the coil springs 13 is X and the number of the groups obtained by division is Y, the number of the coil springs 13 included in each group is X/Y.

Figure 6:
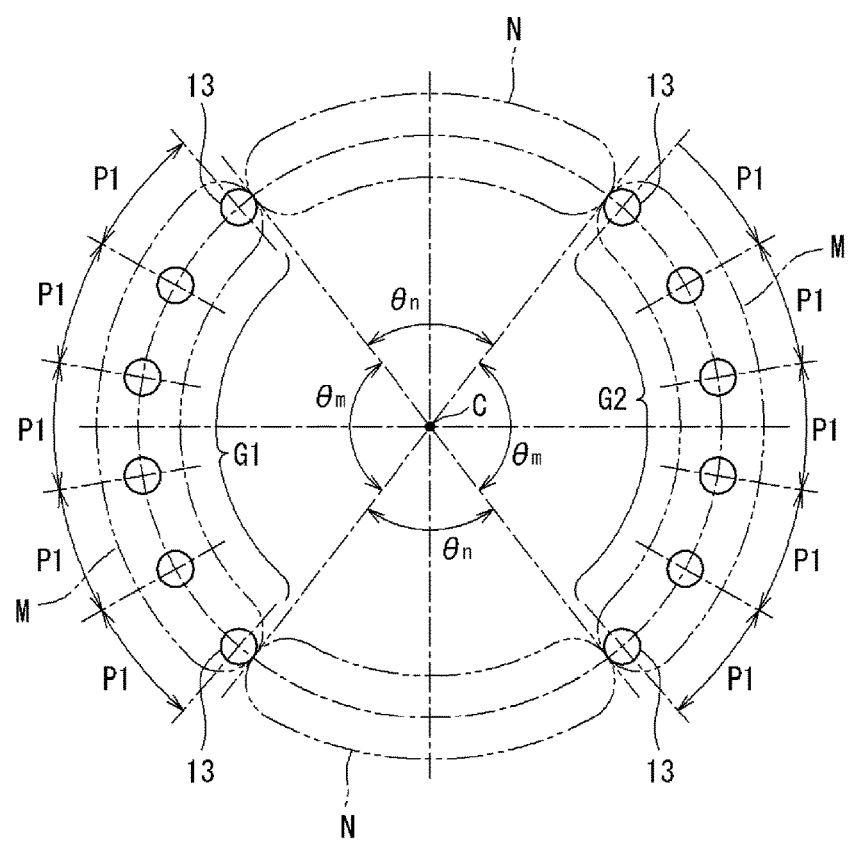
FIG. 6 illustrates an arrangement (a modification of part 1) of the coil springs, and is a view of the mechanical seal as seen from the axial direction.

For example, as a modification of the mechanical seal 7, as shown in FIG. 6, the total number of the coil springs 13 is 12, which is equal to that in the case of FIG. 4, but the number of the groups is two. In this case, the number of the coil springs 13 included in each group is six. The two groups G1, G2 are arranged at equal intervals in the circumferential direction with a point C on the center line of the mechanical seal 7 (the center lines of the sealing rings 11, 12) as a center.

Figure 7:
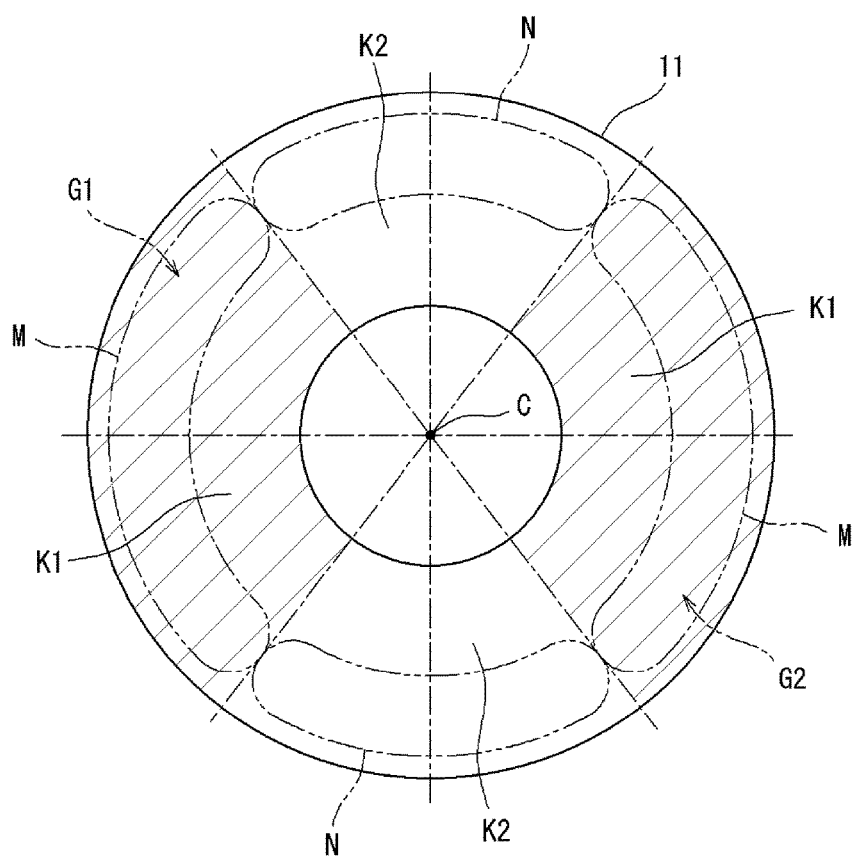
FIG. 7 is a schematic view of the first sealing ring in FIG. 6 as seen from the axial direction.

Also in the embodiment shown in FIG. 6, as shown in FIG. 7, the first sealing ring 11 is configured in which the first regions K1 in each of which occurring distortion is increased by the axial forces of the coil springs 13 that belong to each group (the total axial force) and the second regions K2 in each of which distortion is smaller than that in each first region K1 (almost no distortion occurs) are present alternately along the circumferential direction.

Figure 8:
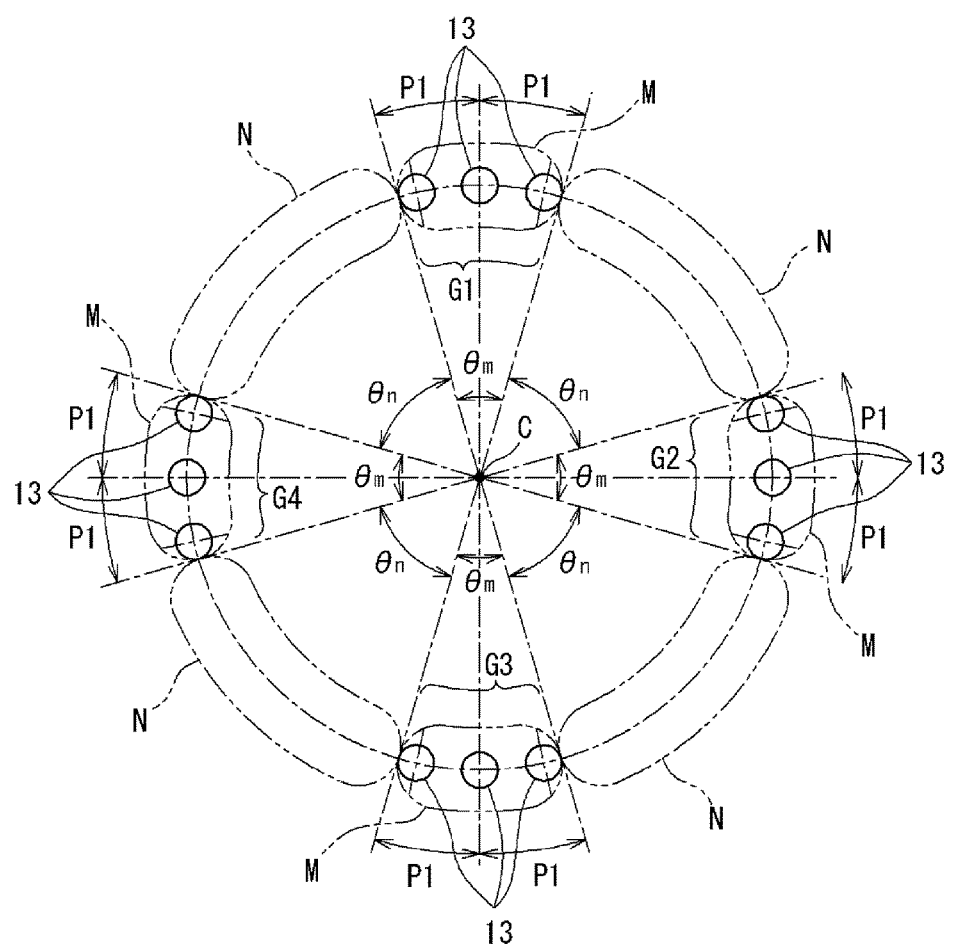
FIG. 8 illustrates an arrangement (another modification of part 1) of the coil springs, and is a view of the mechanical seal as seen from the axial direction.

Furthermore, as another modification, as shown in FIG. 8, the total number of the coil springs 13 is 12, which is equal to that in the case of FIG. 4, but the number of the groups is four. In this case, the number of the coil springs 13 included in each group is three. The four groups G1, G2, G3, and G4 are arranged at equal intervals in the circumferential direction with the point C as a center.

Figure 9:
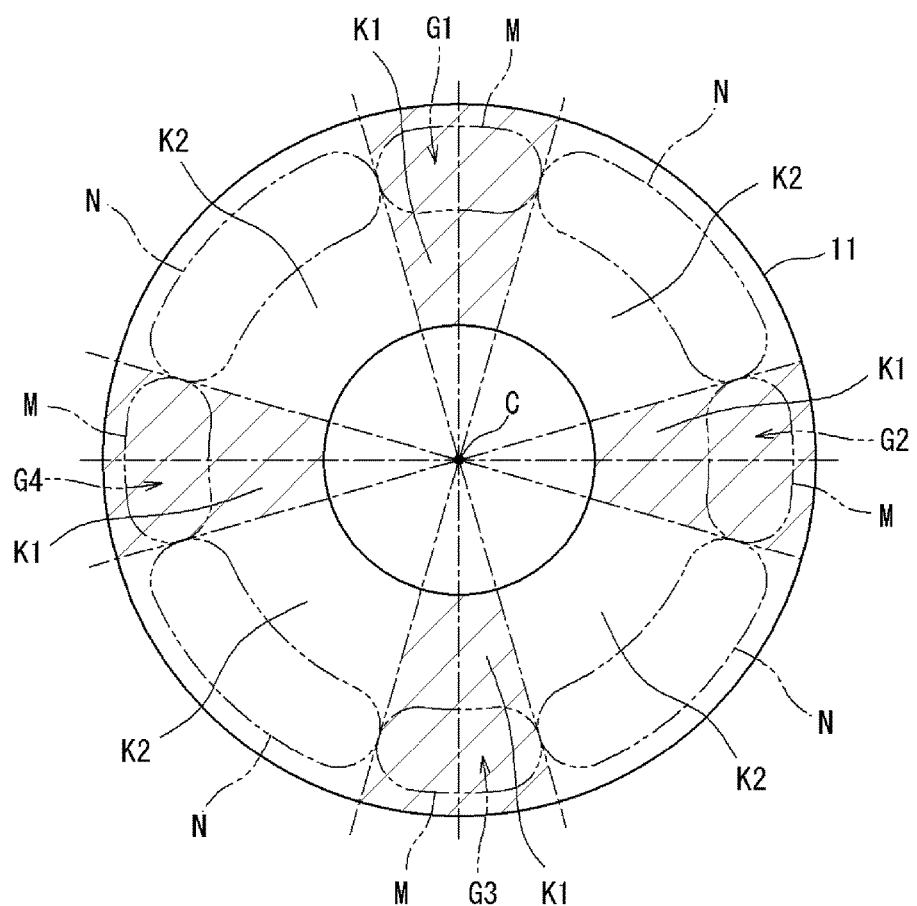
FIG. 9 is a schematic view of the first sealing ring in FIG. 8 as seen from the axial direction.

Also in the embodiment shown in FIG. 8, as shown in FIG. 9, the first sealing ring 11 is configured in which the first regions K1 in each of which occurring distortion is increased by the axial forces of the coil springs 13 that belong to each group (the total axial force) and the second regions K2 in each of which distortion is smaller than that in each first region K1 (almost no distortion occurs) are present alternately along the circumferential direction.

In addition, also in each of the embodiment shown in FIG. 6 and the embodiment shown in FIG. 8, each absence section N in which no coil spring 13 is present is interposed between the groups adjacent to each other in the circumferential direction, whereby the first regions K1 and the second regions K2 are present alternately along the circumferential direction in the first sealing ring 11.

Moreover, each of the circumferential pitches P1 of the coil springs 13 that belong to each group is set so as to be smaller than each of the circumferential pitches P0 of the coil springs 97 in the case where all the coil springs 97 are assumed to be arranged at equal intervals along the circumferential direction as shown in FIG. 12 (P1<P0).

Furthermore, in each of the embodiments shown in FIGS. 4, 6, and 8, a force of pressing the first sealing ring 11 against the second sealing ring 12 which force is generated by the 12 coil springs 13 is nonuniform in the circumferential direction. Thus, it is also considered that balance of the force of pressing the first sealing ring 11 against the second sealing ring 12 is biased as a whole, so that the first sealing ring 11 cannot be pressed against the second sealing ring 12 linearly along the axial direction.

However, in each of the embodiments described above, the first regions K1 and the second regions K2 are present alternately along the circumferential direction in the first sealing ring 11, the ranges, in the circumferential direction, of a plurality of the first regions K1 are the same and the ranges, in the circumferential direction, of a plurality of the second regions K2 are the same, and the sum of the axial forces of the coil springs 13 that belong to each group (the total axial force) is the same among all the groups. Thus, the mechanical seal 7 in which the above force is balanced as a whole is obtained. That is, the first regions K1 and the second regions K2 are present alternately, the number of the coil springs 13 included in each group is the same, and all the coil springs 13 have the same elastic characteristic (spring constant). For example, in the case of FIG. 4, the number of the coil springs 13 included in one group is made uniform as four.

Thus, the total axial force by the coil springs 13 that belong to one group can be prevented from being excessively greater or smaller than the total axial force by the coil springs 13 that belong to another group, and the mechanical seal 7 in which the force is balanced as a whole is obtained. As a result, even if the force of pressing the first sealing ring 11 against the second sealing ring 12 by the 12 coil springs 13 becomes nonuniform in the circumferential direction, these coil springs 13 can press the first sealing ring 11 against the second sealing ring 12 linearly along the axial direction. Furthermore, change in the positions of the first sealing ring 11 and the second sealing ring 12 relative to each other which change is caused due to vibration (swinging) of the shaft body 5 (see FIG. 1), deviation of a right angle (parallelism) between the case body 2 and the shaft body 5, or the like, can be absorbed.

As shown in the embodiments in FIGS. 4, 6, and 8, the 12 coil springs 13 are preferably divided into two to four groups. This is because, if the number of the groups exceeds four, the first regions K1 in each of which distortion is increased affect the second regions K2 in each of which distortion should be decreased, so that the distortion in each second region K2 tends to increase. In this case, small concaves and convexes are unlikely to be formed on the first seal surface 21 of the first sealing ring 11 (the first seal surface 21 is unlikely to have a wavy shape), and an effective gap (partial gap) is difficult to occur between the first seal surface 21 of the first sealing ring 11 and the second seal surface 22 of the second sealing ring 12. In contrast, as in each of the embodiments described above, since the 12 coil springs 13 are divided into two to four groups, the first regions K1 and the second regions K2 are clearly defined, and a partial gap is easily formed between the seal surfaces 21, 22.

[Arrangement (Part 2) of Coil Springs 13]

Figure 10:
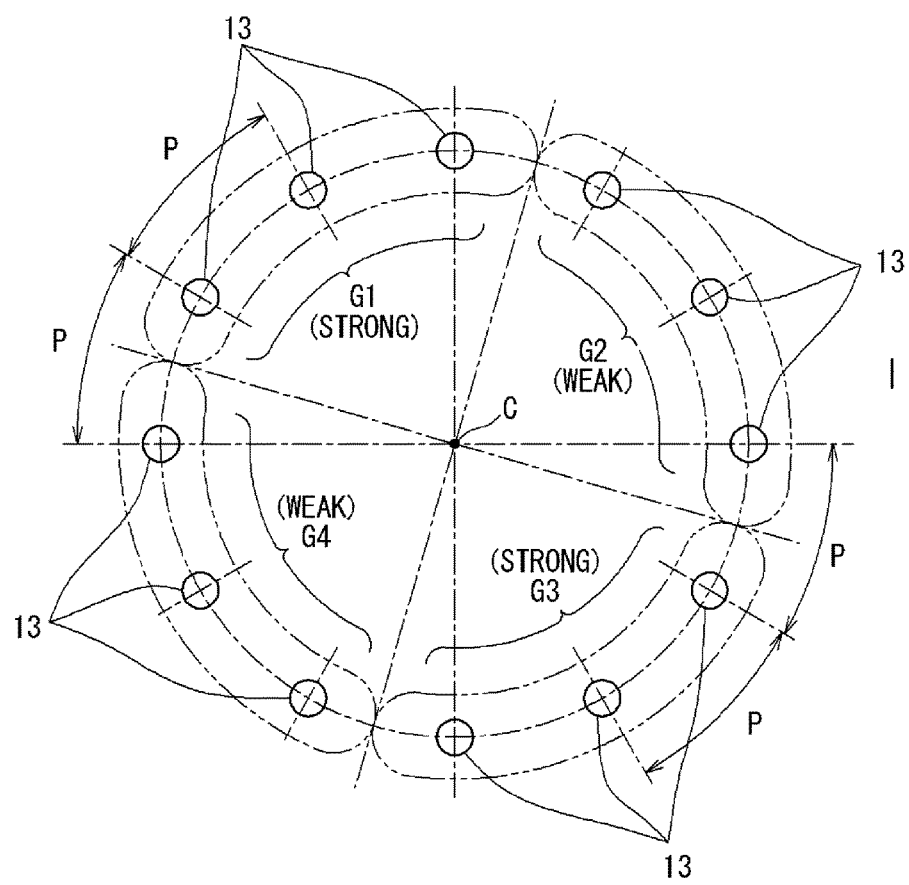
FIG. 10 illustrates an arrangement (part 2) of the coil springs, and is a view of the mechanical seal as seen from the axial direction.

FIG. 10 illustrates another arrangement of the coil springs 13, and is a view of the mechanical seal 7 as seen from the axial direction. In the embodiment shown in FIG. 10, 12 coil springs 13 are provided, are arranged on the same circle, and are arranged at equal intervals along the circumferential direction. That is, circumferential pitches P of the coil springs 13 are uniform. These coil springs 13 include two types of coil springs 13 having different elastic characteristics (spring constants). The axial lengths of all the coil springs 13 are the same.

The 12 coil springs 13 are divided into a plurality of groups (groups whose number is a plural number and an even number). In the present embodiment, the 12 coil springs 13 are divided into four groups G1, G2, G3, and G4, and three coil springs 13 are included in each group. The three coil springs 13 that belong to the first group G1 and the three coil springs 13 that belong to the third group G3 all have the same elastic characteristic (spring constant). In addition, the three coil springs 13 that belong to the second group G2 and the three coil springs 13 that belong to the fourth group G4 all have the same elastic characteristic (spring constant).

However, the coil springs 13 that belong to the first group G1 and the coil springs 13 that belong to the second group G2 have different elastic characteristics (spring constants), and the elastic characteristic (spring constant) of each coil spring 13 that belongs to the first group G1 is greater than the elastic characteristic (spring constant) of each coil spring 13 that belongs to the second group G2. For example, the wire diameter of each coil spring 13 that belongs to the first group G1 is larger than the wire diameter of each coil spring 13 that belongs to the second group G2.

Thus, in the case where all the 12 coil springs 13 are provided between the first sealing rings 11, 11 so as to be compressed to the same length as shown in FIG. 1, axial forces of pressing the first sealing ring 11 by the three coil springs 13 that belong to the first group G1 (the third group G3) (and a total axial force that is the sum thereof) is greater than axial forces of pressing the first sealing ring 11 by the three coil springs 13 that belong to the second group G2 (the fourth group G4) (and a total axial force that is the sum thereof).

As described above, in the present embodiment, the groups G1 and G3 in each of which the total axial force by a predetermined number of the (three) coil springs 13 is great and the groups G2 and G4 in each of which the total axial force by a predetermined number of the (three which is the same number) coil springs 13 is small, are arranged alternately along the circumferential direction.

Figure 11:
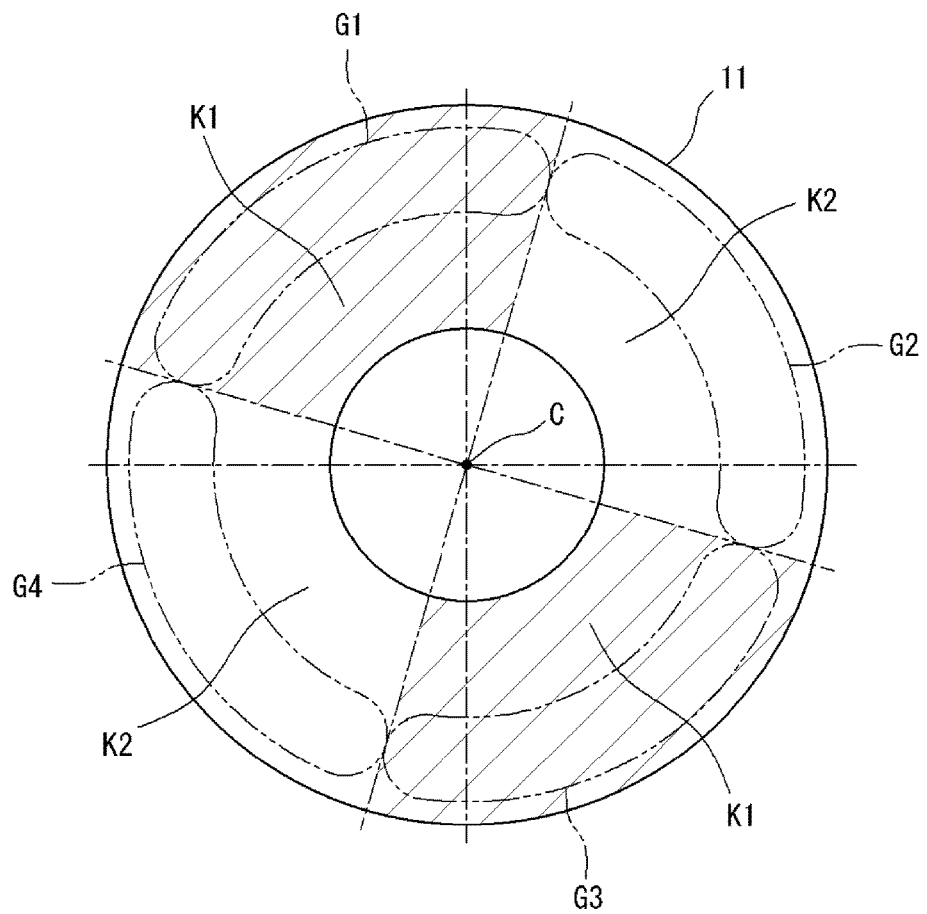
FIG. 11 is a schematic view of the first sealing ring in FIG. 10 as seen from the axial direction.

Thus, the three coil springs 13 included in each of the groups G1, G3 strongly press the first region K1 that is a portion of the first sealing ring 11 shown in FIG. 11, toward the axial direction. On the other hand, the three coil springs 13 included in each of the groups G2, G4 weakly press the second region K2 that is another portion of the first sealing ring 11 shown in FIG. 11, toward the axial direction.

FIG. 11 is a view of the first sealing ring 11 as seen from the axial direction. In FIG. 11, the first regions K1 are hatched regions, and regions other than the first regions K1 are the second regions K2.

Each first region K1 receives a total axial force obtained by combining the great axial forces by the three coil springs 13, whereby relatively great distortion occurs in the first region K1. On the other hand, each second region K2 receives a total axial force obtained by combining the small axial forces by the three coil springs 13, whereby smaller distortion occurs than in each first region K2. That is, the degree of shape change of the first seal surface 21 in each first region K1 is higher than that of the first seal surface 21 in each second region K2, and relatively, the former shifts to a convex shape and the latter shifts to a concave shape.

As described above, distortion can be increased in each first region K1 of the first sealing ring 11 by the coil springs 13 that belong to the group G1 or G3 in which the total axial force is great, and distortion can be decreased in each second region K2 of the first sealing ring 11 by the coil springs 13 that belong to the group G2 or G4 in which the total axial force is small.

As described above, in the present embodiment, in the mechanical seal 7, the three coil springs 13 aligned continuously in the circumferential direction form one group, and the 12 coil springs 13 are divided into the four groups G1, G2, G3, and G4 as a whole. As shown in FIG. 11, the first regions K1 and the second regions K2 are present alternately along the circumferential direction in the first sealing ring 11. Among these regions, each first region K1 is a region in which distortion occurring in the first sealing ring 11 is increased by the axial forces of the coil springs 13 that belong to the group G1 or G3 (the total axial force). On the other hand, each second region K2 is a region in which distortion is made smaller than that in each first region K1 by the axial forces of the coil springs 13 that belong to the group G2 or G4 (the total axial force). That is, the groups G1, G3 in each of which the total axial force by the three coil springs 13 is great and the group G2, G4 in each of which the total axial force by the three coil springs 13 is small are arranged alternately along the circumferential direction, whereby the first regions K1 and the second regions K2 are present alternately along the circumferential direction in the first sealing ring 11.

According to the mechanical seal 7, since the first regions K1 and the second regions K2 are present alternately along the circumferential direction in the first sealing ring 11, small concaves and convexes are formed on the first seal surface 21 of the first sealing ring 11 (the first seal surface 21 waves modestly) during use, so that a slight gap occurs partially between the first seal surface 21 of the first sealing ring 11 and the second seal surface 22 of the second sealing ring 12. This slight gap occurs in a portion corresponding to each second region K2.

A very small part of the fluid flowing through the fluid passage 108 (see FIG. 1) can enter this gap, so that a lubricating film is easily formed between the seal surfaces 21, 22 by this fluid, thereby improving the lubricating performance.

Here, rotation of the first sealing ring 11 is prevented at the case body 2 by engaging the drive pin 137 with the claw portion 138 (see FIG. 3) as described above. Here, if the sliding friction between the first sealing ring 11 and the second sealing ring 12 increases so that the first sealing ring 11 attempts to rotate with the second sealing ring 12, an unexpected load may be applied to the claw portion 138 for rotation prevention, to break the claw portion 138. However, in the present embodiment, by causing distortion to occur in the first sealing ring 11, the fluid can enter between the first sealing ring 11 and the second sealing ring 12 to form a lubricating film therebetween, thereby suppressing an increase in the sliding friction between the first sealing ring 11 and the second sealing ring 12. Thus, it is possible to prevent such breakage.

If the sliding friction between the seal surfaces 21, 22 increases so that rotation of the second sealing ring 12 is suppressed by the first sealing ring 11, the second sealing ring 12 and the sleeve 111 (see FIG. 3) may slide relative to each other to wear or break the end face 113 of the sleeve 111, or the second sealing ring 12 and the O-ring 117 may slide relative to each other to damage the O-ring 117. However, in the present embodiment, since an increase in the sliding friction between the first sealing ring 11 and the second sealing ring 12 can be suppressed, it is possible to prevent such breakage or damage.

Furthermore, according to the mechanical seal 7 of the present embodiment, abnormal wear, surface roughening, and the like are unlikely to occur at the seal surfaces 21, 22, and it is possible to suppress occurrence of leak of the fluid through between the seal surfaces 21, 22.

In the present embodiment, a force of pressing the first sealing ring 11 against the second sealing ring 12 which force is generated by the 12 coil springs 13 is nonuniform in the circumferential direction. Thus, similarly to the embodiments described above, it is also considered that balance of the force of pressing the first sealing ring 11 against the second sealing ring 12 is biased as a whole, so that the first sealing ring 11 cannot be pressed against the second sealing ring 12 linearly along the axial direction.

However, the first regions K1 and the second regions K2 are present alternately along the circumferential direction in the first sealing ring 11, the ranges, in the circumferential direction, of a plurality of the first regions K1 are the same and the ranges, in the circumferential direction, of a plurality of the second regions K2 are the same, the coil springs 13 are arranged at equal pitches, and the number of the coil springs 13 included in each group is the same (three). Thus, the mechanical seal 7 in which the force is balanced as a whole is obtained. As a result, even if the force of pressing the first sealing ring 11 against the second sealing ring 12 by the 12 coil springs 13 becomes nonuniform in the circumferential direction, these coil springs 13 can press the first sealing ring 11 against the second sealing ring 12 linearly along the axial direction. Furthermore, change in positions of the first sealing ring 11 and the second sealing ring 12 relative to each other which change is caused due to vibration (swinging) of the shaft body 5 (see FIG. 1), deviation of a right angle (parallelism) between the case body 2 and the shaft body 5, or the like, can be absorbed.

Also in the present embodiment, the 12 coil springs 13 are preferably divided into two to four groups. This is because, if the number of the groups exceeds four, the first regions K1 in each of which distortion is increased affect the second regions K2 in each of which distortion should be decreased, so that the distortion in each second region K2 tends to increase. In this case, small concaves and convexes are unlikely to be formed on the first seal surface 21 of the first sealing ring 11 (the first seal surface 21 is unlikely to have a wavy shape), and an effective gap (partial gap) is difficult to occur between the first seal surface 21 of the first sealing ring 11 and the second seal surface 22 of the second sealing ring 12. In contrast, as in each of the embodiments described above, since the 12 coil springs 13 are divided into two to four groups, the first regions K1 and the second regions K2 are clearly defined, and a partial gap is easily formed between the seal surfaces 21, 22.

Each Embodiment

In each of the embodiments described above, the materials of the first sealing rings 11 and the second sealing rings 12 are not particularly limited, and the materials used in the conventional art can be used. However, at least for the first sealing rings 11, a material having lower rigidity than a metallic material is preferable in order to allow distortion to relatively easily occur, and, for example, carbon and silicon carbide (SiC) are preferable.

In the case where the materials of the first sealing rings 11 and the second sealing rings 12 are the materials as described above and are the same, an increase in the sliding friction between the seal surfaces 21, 22 is likely to occur in the conventional art, and even in the case where the materials of the first sealing rings 11 and the second sealing rings 12 are different materials (e.g., carbon and silicon carbide), an increase in the sliding friction therebetween occurs. However, according to the present embodiment, it is possible to suppress such an increase in the sliding friction.

The rotary joint 1 and each mechanical seal 7 are not limited to the illustrated form and may be in another form within the scope of the present invention.

In each of the embodiments described above, the number of the coil springs 13 of each mechanical seal 7 is 12, but is not limited thereto, and, for example, may be greater than 12 or may be smaller than 12. In addition, the number of the mechanical seals 7 is also changeable.

REFERENCE SIGNS LIST 1 rotary joint
2 case body
5 shaft body
7 mechanical seal
11 first sealing ring
12 second sealing ring
13 coil spring (elastic member)
21 first seal surface
22 second seal surface
118 second flow passage
128 flow passage
133 first flow passage
155 flow passage
A annular space
G1 to G4 group
K1 first region K2 second region
N absence section
P1 circumferential pitch
P0 circumferential pitch

The invention claimed is:

1. A rotary joint comprising:
a tubular case body having a first flow passage formed therein to be opened at an inner peripheral side thereof;
a shaft body provided within the case body and rotatable relative to the case body, the shaft body having a second flow passage formed therein to be opened at an outer peripheral side thereof; and
a mechanical seal provided in an annular space formed between the case body and the shaft body, the mechanical seal defining the annular space to form a flow passage connecting the first flow passage to the second flow passage, wherein
the mechanical seal includes:
a first sealing ring attached to the case body and having an annular first seal surface at one side in an axial direction;
a second sealing ring attached to the shaft body and having an annular second seal surface which slidably contacts with the first seal surface; and
a plurality of elastic members provided along the first sealing ring in a circumferential direction and configured to apply axial forces to the first sealing ring to press the first seal surface against the second seal surface, wherein
the plurality of elastic members are divided into a plurality of groups, each composed of elastic members aligned continuously in the circumferential direction, wherein
the elastic members of each group are arranged at equal intervals along the circumferential direction within a respective group, and the elastic members in different groups are arranged at unequal intervals along the circumferential direction with respect to the elastic members that belong to the different groups, and
first regions in each of which an occurring first distortion is increased by the axial forces of the elastic members that belong to the respective group and second regions in each of which a second distortion smaller than the first distortion occurs, alternate along the circumferential direction in the first sealing ring.

2. The rotary joint according to claim 1, wherein an absence section in which the elastic members are not present is interposed between the groups adjacent to each other in the circumferential direction, and wherein the first regions and the second regions are present alternately along the circumferential direction in the first sealing ring.

3. The rotary joint according to claim 2, wherein a circumferential pitch of the elastic members that belong to each of the groups is smaller than a circumferential pitch of the elastic members where the plurality of elastic members are arranged at equal intervals along the circumferential direction.

4. The rotary joint according to claim 1, wherein the number of the elastic members included in each of the groups is the same.

5. The rotary joint according to claim 1, wherein the plurality of elastic members are divided into two to four groups.

6. A rotary joint comprising:
a tubular case body having a first flow passage formed therein to be opened at an inner peripheral side thereof;
a shaft body provided within the case body to be rotatable relative to the case body, the shaft body having a second flow passage formed therein to be opened at an outer peripheral side thereof; and
a mechanical seal provided in an annular space formed between the case body and the shaft body, the mechanical seal defining the annular space to form a flow passage connecting the first flow passage to the second flow passage, wherein
the mechanical seal includes: a first sealing ring attached to the case body and having an annular first seal surface at one side in an axial direction; a second sealing ring attached to the shaft body and having an annular second seal surface which slidably contacts with the first seal surface; and a plurality of elastic members provided along the first sealing ring in a circumferential direction and configured to apply axial forces to the first sealing ring to press the first seal surface against the second seal surface, wherein
the plurality of elastic members are arranged at equal intervals along the circumferential direction and include: first elastic members aligned continuously in the circumferential direction and having a first spring constant; and second elastic members aligned continuously in the circumferential direction and having a second spring constant smaller than the first spring constant, wherein
the plurality of elastic members are divided into a plurality of groups including a first group composed of the first elastic members having a first total axial force and a second group composed of the second elastic members having a second total axial force smaller than the first total axial force, wherein
the first sealing ring includes first regions each having a first distortion caused by axial forces of the first elastic members that belong to the first group having the first total axial force; and second regions each having a second distortion caused by axial forces of the second elastic members that belong to the second group having the second total axial force, the first distortion being larger than the second distortion, and wherein
the first regions and the second regions are formed alternatively with each other along the circumferential direction.

* * * * *